United States Patent [19]

Lorenz et al.

[11] Patent Number: 4,776,886
[45] Date of Patent: Oct. 11, 1988

[54] HALFTONE GRAVURE PRINTING INKS CONTAINING AN AZO DYESTUFF

[75] Inventors: Manfred Lorenz, Cologne; Rainer Hamprecht, Odenthal; Artur Haus, Overath, all of Fed. Rep. of Germany

[73] Assignee: Bayer Aktiengesellschaft, Leverkusen, Fed. Rep. of Germany

[21] Appl. No.: 893,079

[22] Filed: Aug. 4, 1986

[30] Foreign Application Priority Data

Aug. 8, 1985 [DE] Fed. Rep. of Germany ....... 3528424
Jan. 9, 1986 [DE] Fed. Rep. of Germany ....... 3600349

[51] Int. Cl.$^4$ ...................... C09D 11/00; C09D 11/02; C09D 11/16
[52] U.S. Cl. ........................................ 106/22; 106/23; 106/496; 534/639; 534/650; 534/649; 534/753; 534/850; 534/852; 534/856; 534/857; 534/858; 534/847; 534/651; 534/573
[58] Field of Search ............... 534/650, 850, 856, 639, 534/753 L, 649, 852, 856, 857, 858, 847, 651; 106/22, 23

[56] References Cited

U.S. PATENT DOCUMENTS 2,691,595 10/1954 Drautz ......................... 534/573 X

OTHER PUBLICATIONS

Color, Chemical Abstracts, vol. 102, No. 222143n (1985).
Toyo, Chemical Abstracts, vol. 95, No. 205613k (1981).
Yamamoto, Chemical Abstracts, vol. 94, No. 17114d (1981).

Primary Examiner—Floyd D. Higel
Attorney, Agent, or Firm—Sprung, Horn, Kramer & Woods

[57] ABSTRACT

A halftone gravure printing ink
 (A) about 2 to about 20% by weight of colorant,
 (B) about 10 to about 40% by weight of resin and
 (C) about 80 to about 50% by weight of solvent
wherein said colorant comprises azo dyestuff of the formula

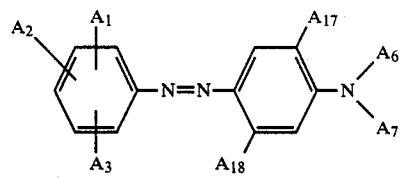

in which $A_1$, $A_2$ and $A_3$ denote hydrogen, halogen, —CN, —NO$_2$, $C_1$-$C_6$-alkyl, cycloalkyl, $C_1$-$C_{18}$-alkoxy, optionally substituted phenoxy, optionally substituted $C_1$-$C_{18}$-alkylsulphonyl, optionally substituted phenylsulphonyl, optionally substituted sulphamoyl, optionally substituted carbamoyl, optionally substituted phenylazo, $C_1$-$C_{18}$-alkoxycarbonyl, —CF$_3$, —SCN, $C_1$-$C_{12}$-alkylmercapto, $C_1$-$C_6$-alkylcarbonyl, optionally substituted phenylcarbonyl or —OH, $A_4$ and $A_5$ denote hydrogen, halogen, optionally substituted $C_1$-$C_6$-alkyl, optionally substituted $C_1$-$C_6$-alkoxy, —NH—CO—CH$_2$CH$_2$OA$_8$, —NH—CO—A$_8$, —NH—SO$_2$—A$_8$, NH—CO—O—A$_9$, —NH—CO—A—COOH, —NH—CO—CH$_2$OA$_8$,

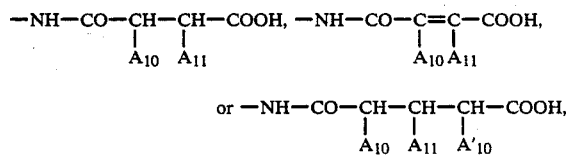

$A_8$ denotes $C_1$-$C_{22}$-alkyl, $C_2$-$C_{22}$-alkenyl, $C_3$-$C_7$-cycloalkyl, phenyl, naphthyl or phenyl-$C_1$-$C_4$-alkyl, it being possible for the aryl radicals mentioned to be substituted, $A_9$ denotes $C_1$-$C_{22}$-alkyl, $C_2$-$C_{22}$-alkenyl, $C_3$-$C_7$-cycloalkyl or phenyl-$C_1$-$C_4$-alkyl, $A_{10}$, $A'_{10}$, and $A_{11}$ denote hydrogen, $C_1$-$C_{22}$-alkyl or $C_2$-$C_{22}$-alkenyl, A denotes $$-CH\text{———}CH-, \text{ or } -C=\!=\!=C-,$$
$$\quad\quad A' \quad\quad\quad\quad\quad A''$$

A' and A" denote the remaining members of a carbocyclic 5-membered or 6-membered ring which is optionally substituted, $A_6$ denotes aryl, or $A_7$ and $A_7$ denotes hydrogen or aliphatic radicals, it being also possible for the radicals $A_4$ and $A_6$ to be connected to form a ring, preferably a 6-membered ring, and for the radicals $A_6$ and $A_7$ to be cyclized by —(CH$_2$)n— groups (n=4 or 5) or —(CH$_2$)$_2$—O—(CH$_2$)$_2$— group.

6 Claims, No Drawings

HALFTONE GRAVURE PRINTING INKS CONTAINING AN AZO DYESTUFF

The invention relates to a process for the preparation of halftone gravure printing inks using azo dyestuffs.

Halftone gravure printing inks, which are used, for example, for printing illustrated magazines and trade catalogues, are low-viscosity liquids which preferably consist of 5–10% of pigment, 25–40% of resin and solvent (see Ullmanns Encyklopädie der technischen Chemie ("Ullmann's Encyklopaedia of Industrial Chemistry"), 4th edition, volume 10, page 196; Verlag Chemie, Weinheim 1973). These printing inks dry through evaporation of the solvent, whereby the resin and the pigment remain behind on the print carrier. It is important that the pigment thereby remains as far as possible on the surface of the print carrier, since too deep penetration of the covering agent into the printed matter results in a reduction of the apparent intensity of colour. When thin and uncoated paper is printed, the result, through a too deep penetration of the colouring agent, can even be strike-through to the reverse side of the paper, as a result of which both the depth of colour and the gloss are impaired and, additionally, clean printing of the reverse side is made more difficult. As a result of using special pigments in the production of halftone printing inks, the pigment particles are retained on or near the surface, caused by the filter action of the absorbent substrate, but, owing to the low viscosity of the printing inks and the rapid penetration caused thereby, strike-through can occur here too. These difficulties are to be expected all the more if soluble dyestuffs are used instead of pigments in the preparation of halftone gravure printing inks. As the filter action of the print carrier is lacking in this case, the soluble dyestuff can penetrate particularly easily and deeply. This is the reason why soluble colorants have hitherto only found very limited use in halftone gravure printing processes, for example as so-called toning dyestuffs, together with a predominant proportion of pigments. Particularly on thin and absorbent paper, a greater proportion of soluble dyestuffs would cause striking through and showing through.

It has now been found, surprisingly, that azo dyestuffs of the formula

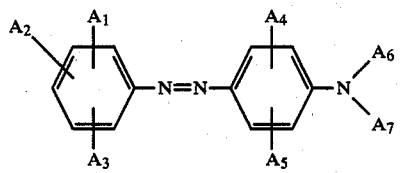

in which $A_1$, $A_2$ and $A_3$ denote hydrogen, halogen, such as Cl, Br or F, —CN, —NO$_2$, $C_1$–$C_6$-alkyl, in particular methy and ethyl, cycloalkyl, in particular cyclopentyl and cyclohexyl, $C_1$–$C_{18}$-alkoxy, in particular methoxy and ethoxy, optionally substituted phenoxy, optionally substituted $C_1$–$C_{18}$-alkylsulphonyl, optionally substituted phenylsulphonyl, optionally substituted sulphamoyl, optionally substituted carbamoyl, optionally substituted phenylazo, $C_1$–$C_{18}$-alkoxycarbonyl, —CF$_3$, —SCN, $C_1$–$C_{12}$-alkylmercapto, $C_1$–$C_6$-alkylcarbonyl, optionally substituted phenylcarbonyl or —OH, $A_4$ and $A_5$ denote hydrogen, halogen, such as Cl, Br or F, optionally substituted $C_1$–$C_6$-alkyl, in particular methyl and ethyl, optionally substituted $C_1$–$C_6$-alkoxy, in particular methoxy and ethoxy, —NH—CO—CH$_2$CH$_2$OA$_8$, —NH—CO—A$_8$, —NH—SO$_2$—A$_8$, NH—CO—O—A$_9$, —NH—CO—A—COOH, —NH—CO—CH$_2$OA$_8$,

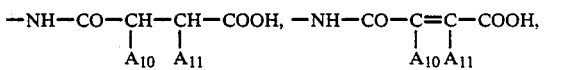

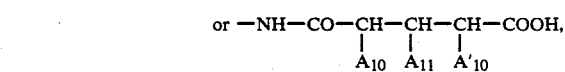

$A_8$ denotes $C_1$–$C_{22}$-alkyl, $C_2$–$C_{22}$-alkenyl, $C_3$–$C_7$-cycloalkyl, in particular cyclopentyl and cyclohexyl, phenyl, naphthyl or phenyl-$C_1$–$C_4$-alkyl, it being possible for the aryl radicals mentioned to be substituted, for example, by $C_1$–$C_6$-alkyl, $C_1$–$C_6$-alkoxy, Cl, Br, F, —NO$_2$ and cyclohexyl, $A_9$ denotes $C_1$–$C_{22}$-alkyl, $C_2$–$C_{22}$-alkenyl, $C_3$–$C_7$-cycloalkyl or phenyl-$C_1$–$C_4$-alkyl, $A_{10}$, $A'_{10}$, and $A_{11}$ denote hydrogen, $C_1$–$C_{22}$-alkyl or $C_2$–$C_{22}$-alkenyl, preferably dodecenyl, A denotes

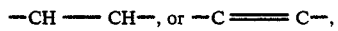

A' and A" denote the remaining members of a carbocyclic 5-membered or 6-membered ring which is optionally substituted by $C_1$–$C_4$-alkyl, in particular methyl, halogen, such as chlorine or bromine, or —COOH, $A_6$ denotes aryl, preferably optionally substituted phenyl, or $A_7$ and $A_7$ denotes hydrogen or aliphatic radicals, it being also possible for the radicals $A_4$ and $A_6$ to be connected to form a ring, preferably a 6-membered ring, for example a tetrahydroquinoline or benzomorpholine ring, and for the radicals $A_6$ and $A_7$ to be cyclized by —(CH$_2$)n— groups (n=4 or 5) or —(CH$_2$)$_2$—O—(CH$_2$)$_2$— group, are also suitable for the preparation of halftone gravure printing inks.

The phenylsulphonyl, phenoxy, phenylcarbonyl and phenylazo radicals $A_1$, $A_2$ and $A_3$ can be substituted, for example, by $C_1$–$C_6$-alkyl, $C_1$–$C_6$-alkoxy, Cl, Br, F, —NO$_2$ and cyclohexyl.

The $C_1$–$C_{18}$-alkylsulphonyl radicals $A_1$, $A_2$ and $A_3$ can be substituted, for example, by $C_1$–$C_6$-alkoxy. $C_1$–$C_6$-alkoxy-$C_1$–$C_6$-alkylsulphonyl radicals may be mentioned as examples.

The sulphamoyl and carbamoyl groups $A_1$, $A_2$ and $A_3$ can be substituted, for example, by one or two $C_1$–$C_{18}$-alkyl radicals which can be further substituted by —OH, —CN or a radical

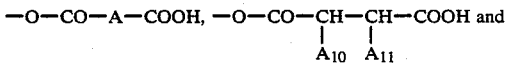

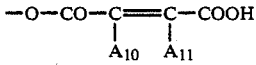

The $C_1$–$C_6$-alkyl radicals $A_4$ and $A_5$ can be substituted, for example, by —COOH and $C_1$–$C_6$-alkoxycarbonyl. The $C_1$-$C_6$-alkoxy radicals $A_4$ and $A_5$ can be substituted, for example, by $C_1$-$C_4$-alkoxy. The phenyl radicals $A_6$ can be substituted, for example, by $C_1$-$C_6$-alkyl, $C_1$-$C_6$-alkoxy, cyclohexyl, Cl, Br, F and —$NO_2$.

The following are preferred radicals A:

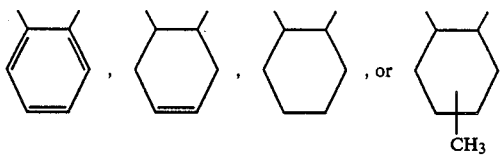

The aliphatic radicals $A_6$ and $A_7$ are preferably $C_1$-$C_{22}$-alkyl and $C_2$-$C_{22}$-alkenyl radicals which are optionally interrupted by non-adjacent O atoms and/or are substituted, or are $C_3$-$C_7$-cycloalkyl radicals. The following are examples of suitable substituents in these alkyl and alkenyl radicals: —OH, —CN, —O—CO—A—COOH,

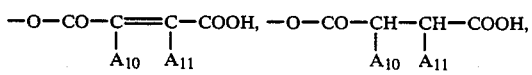

—O—CO—$A_8$, —O—COO—$A_9$, —COO$A_9$ or —O$A_{12}$ wherein

A, $A_8$, $A_9$, $A_{10}$ and $A_{11}$ have the meanings indicated for formula I and $A_{12}$ represents $C_3$-$C_7$-cycloalkyl, in particular cyclopentyl and cyclohexyl, phenyl, naphthyl and phenyl-$C_1$-$C_4$-alkyl.

Preferred radicals $A_6$ and $A_7$ are as follows: hydrogen, $C_1$-$C_{22}$-alkyl which is substituted by —CN or —OH, $C_2$-$C_{22}$-alkenyl, $C_3$-$C_7$-cycloalkyl,

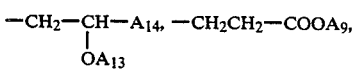

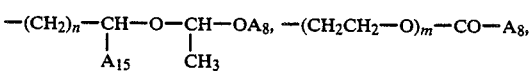

—($CH_2CH_2O$)$_m$—$A_{15}$, wherein $A_{13}$ denotes H,

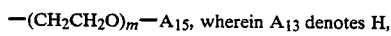

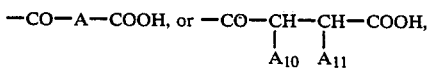

$A_{14}$ denotes hydrogen, $C_1$-$C_8$-alkyl or —$CH_2$—O—$A_8$, $A_{15}$ denotes hydrogen or $C_1$-$C_8$-alkyl, n denotes 1, 2 or 3 and m denotes 1, 2, 3, 4, 5, 6, 7, 8, 9 or 10 and $A_8$, $A_{10}$, $A_{11}$ and A have the meanings indicated for formula I.

It is preferable to employ the following compounds according to formula I:

1. Compounds in which

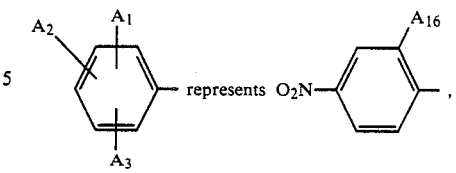

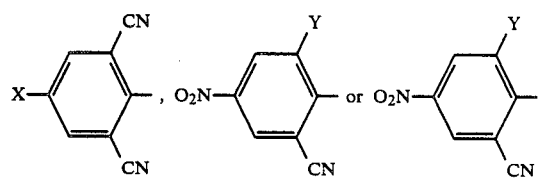

wherein $A_{16}$ denotes Cl, Br or CN,

X denotes H, $CH_3$, $C_2H_5$, $C_6H_{12}$, tert.-butyl, $C_1$-$C_4$-alkoxy, Cl or Br, Y denotes —$NO_2$, —CN, —$CF_3$ or $C_1$-$C_{12}$-alkylsulphonyl and Y' denotes —$NO_2$ or —CN.

2. Compounds in which

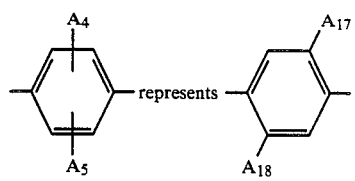

wherein $A_{17}$ denotes hydrogen, chlorine, $C_1$-$C_4$-alkyl, in particular methyl and ethyl, and $C_1$-$C_4$-alkoxy, in particular methoxy and ethoxy, $A_{18}$ represents —NH—CO—$CH_2CH_2$—O$A_8$, —NH—CO—$A_8$, —NH—CO—O—$A_9$, —NH—COCH$_2$—O$A_8$, —NH—CO—A—COOH,

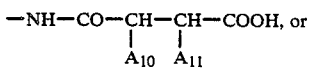

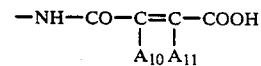

and

A, $A_8$, $A_9$, $A_{10}$ and $A_{11}$ have the meaning indicated for formula I.

Thus it is particularly preferable to employ compounds of the formulae

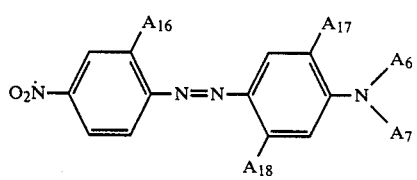

(II)

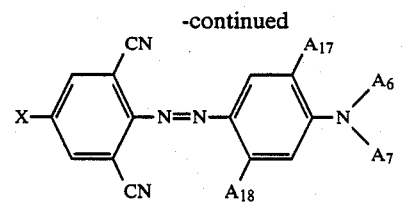 (IIa)

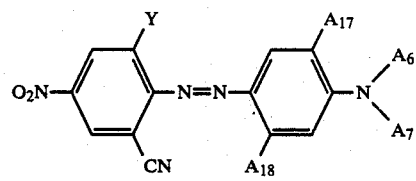 (IIb)

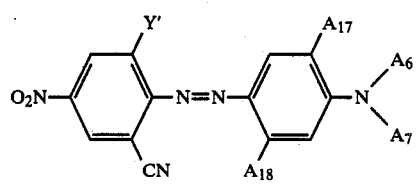 (IIc)

having the abovementioned meanings for $A_6$, $A_7$, $A_{16}$, $A_{17}$, $A_{18}$, X, Y and Y'.

It is particularly preferable for

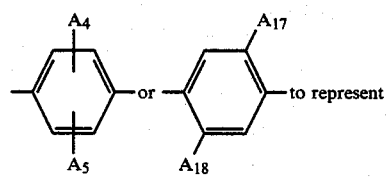 to represent

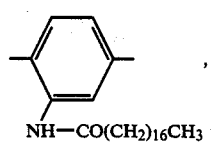,

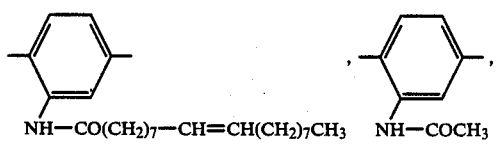,

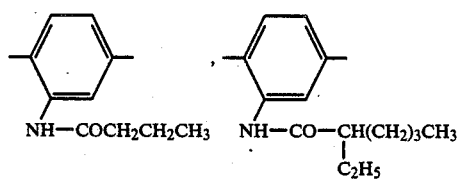,

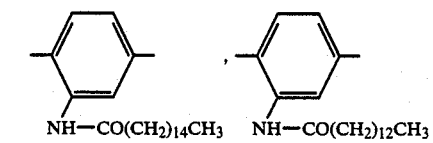,

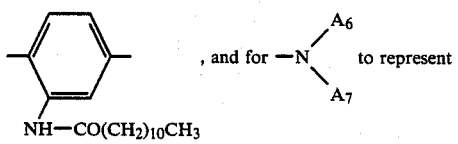, and for $-N\begin{smallmatrix}A_6\\A_7\end{smallmatrix}$ to represent $-N(C_2H_5)_2$, $-N(C_3H_7)_2$, $-N(CH_3)_2$,

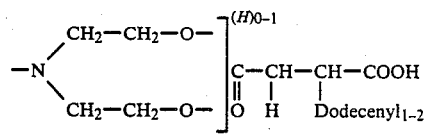

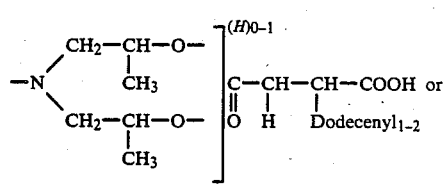

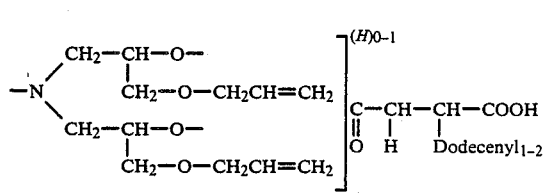

The last-mentioned radicals are introduced by reacting the corresponding OH compounds with dodecenylsuccinic anhydride.

The compounds of the formula I are known or can be prepared analogously to processes which are known from the literature (see, for example, German Patent Specification No. 655,590, EP-A No. 273,382, Swiss Patent Specification No. 567,067, German Offenlegungsschrift No. 1,544,386, German Offenlegungsschrift No. 2,815,506, German Offenlegungsschrift No. 1,544,386, German Offenlegungsschrift No. 2,129,590 and Italian Patent Specification No. 886,176).

The invention also relates to new dyestuffs of the formulae

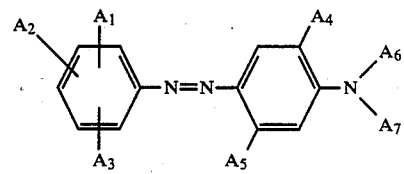 (III)

or

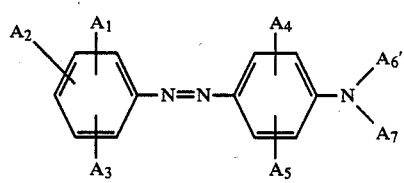 (IV)

in which
$A_5'$ represents

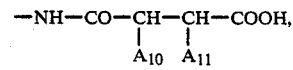

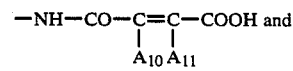 and $A_6'$ represents a $C_1$–$C_{22}$-alkyl or $C_2$–$C_{22}$-alkenyl radical, which is optionally substituted by —O—CO—A—COOH,

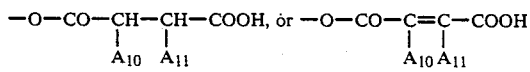

or, in particular, a radical

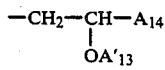

wherein
$A'_{13}$ denotes —CO—A—COOH,

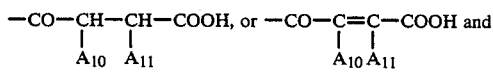

$A_1$, $A_2$, $A_3$, $A_4$, $A_5$, $A_6$, $A_7$, A, $A_{10}$, $A_{11}$ and $A_{14}$ have the meaning indicated above.

Compounds of the formula I in which the proportion by weight in the dyestuff molecule of hydrocarbon radicals not directly attached to the azo group is at least 20%, particularly preferably at least 25% and very particularly preferably at least 30% are preferably used in the preparation of halftone gravure printing inks.

The calculation of the selection of these compounds will be illustrated by means of two examples:

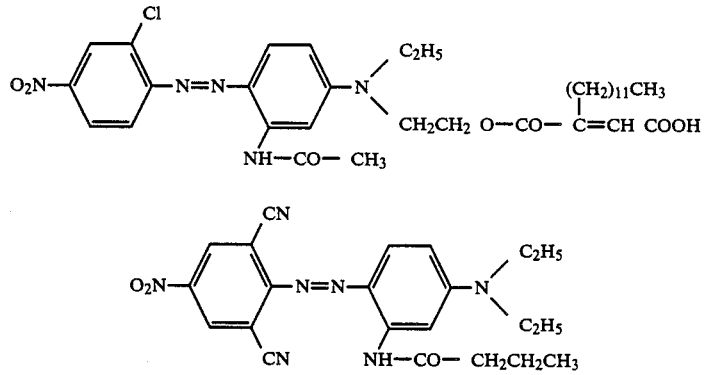

In the formulae (α) and (β), the hydrocarbon radicals which are not directly attached to the azo group have been marked.

In formula (α), the proportion by weight of these radicals in the total weight of the molecule is 39.6%, and in formula (β) it is 23.8%.

The halftone gravure printing inks which have been prepared using the dyestuffs of the formula I preferably contain, relative to the weight of the components (A), (B) and (C):

(A) about 2 to about 20% by weight of colorant,
(B) about 10 to about 40% by weight of resin and
(C) about 80 to about 50% by weight of solvent.

The colorant can also be a mixture of different dyestuffs of the formula I and also, in particular, a mixture of at least one dyestuff of the formula I and at least one pigment which is suitable for halftone gravure printing inks. The last-mentioned mixtures can contain up to 90% by weight, preferably up to 50% by weight, of pigment.

Pigments which are suitable for the preparation of mixtures of the dyestuffs of the formula I with pigments are preferably red pigments, such as C.I. Pigment Red 2, 53, 57:1, 112, 122, 146 and 148. In addition, pigments having a different colour shade are also suitable for the production of special shades, for example C.I. Pigment Yellow 12, 13, 14, 17, 74 and 83, C.I. Pigment Orange 5 and 34, C.I. Pigment Violet 19, C.I. Pigment Blue 15 and 27, C.I. Pigment Green 7 and 36 and C.I. Pigment Black 7. The dyestuffs of the formula I can also be used for shading the pigments mentioned.

Examples of suitable resins are Gilsonite asphalt, colophony-modified resins, for example calcium, zinc and magnesium salts of resin acids and modification products thereof, resin esters, maleate resins, colophony-modified phenolic resins, hydrocarbon resins, ketone resins, chlorinated rubber, nitrocellulose, polyamide resins, schellack, vinyl resins and others.

Suitable types are listed, for example, in Karsten, Lackrohstofftabellen ("Tables of paint raw materials"), 7th edition, Curt R. Vincentz Verlag.

Suitable solvents are aromatic and aliphatic hydrocarbons, such as light petroleum fractions, $C_5$–$C_8$-aliphatic hydrocabons, xylene and, particularly preferably, toluene.

It is also possible to employ mixtures of aliphatic and aromatic hydrocabons.

The present invention preferably relates to the use of dyestuffs of the formula I in the preparation of halftone gravure printing inks based on toluene.

In order to prepare the halftone gravure printing inks, the dyestuffs of the formulaI, optionally mixed with pigments, are incorporated into the printing ink mixtures in a customary manner.

In the process according to the invention for the preparation of halftone gravure printing inks, inorganic additives having a BET specific surface area of at least 50 m²/g, preferably at least 100 m²/g and particularly preferably at least 200 m²/g, can be added in addition to the dyestuff of the formula I.

The additives which have proved suitable are, in particular, aluminium hydroxides and, very particularly, silica. The additives are preferably employed in amounts of 0.2–2% by weight, particularly preferably 0.4–0.9% by weight, relative to the weight of printing ink.

These additives make it possible to reduce further the tendency of the dyestuffs to strike through, and achieve results such as can otherwise only be achieved when pigments alone are used.

The finely disperse silicas which are preferably employed are finely divided silicas which are predominantly amorphous, crosslinked to a varying extent and have the specific surface areas mentioned above. Silicas of this type are known, for example, from Ullmanns Encyklopädie der technischen Chemie ("Ullmann's Encyclopaedia of Industrial Chemistry"), 4th edition, volume 21, pages 451-476. The silicas can be obtained, for example, by precipitation from solutions or by pyrogenic processes; as well as a predominance of silica, they can also contain other metal oxides and hydroxides, for example those of aluminium and titanium.

It is necessary for the silicas to be dispersed in the gravure printing ink. This dispersing can be carried out in the finished gravure printing ink or in a concentrate. However, it is also possible first to prepare a dispersion in the solvent used for the gravure printing inks, if appropriate also in a higher concentration, and part or all of the resin can be added at this stage. The following are examples of suitable dispersing units: stirrers, high-speed stirrers, dissolvers, bead mills and ball mills or a combination of these units.

In addition to the silicas, it can also be advantageous to add wetting agents and dispersing agents to these silicas. The salts of strong organophilic acids with aliphatic amines and polyamines optionally containing hydroxyl groups are particularly suitable dispersing agents.

The following are examples of strong organophilic acids: $C_{10}$-$C_{20}$-alkanesulphonic acids, alkylarylsulphonic acids, such as dodecylbenzenesulphonic acid or di-tert.-butylnaphthalenesulphonic acids, or sulphuric acid monoesters or phosphoric acid monoesters or diesters of alkanols or reaction products thereof with ethylene oxide. Examples of alkanols of this type are saturated or unsaturated, linear or branched $C_4$-$C_{22}$-aliphatic alcohols, such as butanol, 2-ethylhexanol, dodecanol, tetradecyl, hexadecyl and octadecyl alcohol and oleyl alcohol and the reaction products of these alcohols with 1-20 moles of ethylene oxide or propylene oxide.

The following are examples of suitable aliphatic amines:

Ethylenediamine, amines of the formula $H_2N(CH_2CH_2NH)_nH$, in which n=2-6, propylenediamine, dipropylenediamine and tallow fat propylenediamine. Examples of suitable amines containing hydroxyl groups are those formed in the reaction of ammonia or $C_1$-$C_{20}$-alkyl mono-, di- or polyamines with ethylene oxide or propylene oxide or with epichlorohydrin.

The following are examples of these: ethanolamine, diethanolamine and triethanolamine, tris-[2-(2-hydroxyethoxy)-ethyl]-amine, bis-[2-(2-hydroxyethoxy)-ethyl]-amine, bis-(2-hydroxyethyl)-methylamine, bis-(2-hydroxyethyl)-ethylamine, bis-(2-hydroxyethyl)-propylamine or bis-(2-hydroxyethyl)-butylamine, 2-(2-aminoethylamino)-ethanol, 2-(hydroxyethyl)-bis-(2-hydroxypropyl)-amine, tris-(2-hydroxypropyl)-amine, 3-[bis-(2-hydroxyethyl)-amino]-propylamine, pentahydroxyethyldiethylenetriamine and 2,3-dihydroxypropylamine; and the reaction products of coconut oil amine, tallow fat amine, stearylamine and oleylamine with 2 moles of ethylene oxide or of tallow fat propylenediamine with 3 moles of ethylene oxide.

These dispersing agents are added in amounts between 10 and 200% by weight, preferably between 50 and 100% by weight, relative to the silica.

Examples of further suitable finely disperse additives are finely disperse aluminium hydroxides or the aluminium hydroxide gels which are substantially amorphous under X-rays and can be obtained, for example, by precipitation from acid aluminium salt solutions by means of bases or by the process of flame hydrolysis. Preferred aluminium hydroxides have a BET specific surface area of at least approximately 50 m$^2$/g. They can be dispersed in the same manner and with the addition of the same dispersing agents as has been described above for the silicas. Mixtures of finely disperse aluminium hydroxides and silicas can also be used in accordance with the invention.

The penetration or striking through of a printing ink can be tested by assessing, visually or colorimetrically from the reverse side, the extent to which a print or coating of the printing ink on the printed material, for example a printing paper, has shown through or struck through.

Striking through is of particular importance in the case of the attractively priced grades of paper which have a paper weight of 42 g/m$^2$ or less and which are increasingly used.

In addition, the new dyestuffs according to the invention can be used for dyeing surface coatings, other organic solvents and mineral oil products, because they are distinguished by an unexpectedly high solubility in these media. Examples of these individual substrates which can be dyed with the new dyestuffs are printing inks based on esters, ketones, glycols, glycol ethers and alcohols, such as ethyl acetate, butyl acetate, methoxyethyl acetate, acetone, methyl ethyl ketone, methylglycol, methyldiglycol, butyldiglycol, ethanol, propanol, butanol, butylphthalate and ethylphthalate, or writing inks, fuel oils and diesel oils and organic solvents in general.

In particular, the new dyestuffs, if appropriate as mixtures with pigments, can also be used for the preparation of flexographic and packaging gravure printing inks. The new dyestuffs can also be employed in this application in the preparations described described containing a finely disperse inorganic additive.

Example 1

17.3 g (0.1 mol) of 2-chloro-4-nitroaniline are stirred overnight with a mixture of 40 ml of water and 35 ml of 10N hydrochloric acid. The mixture is cooled to 0° C. by adding ice and is diazotized with an aqueous solution of 7.0 g of sodium nitrite. The mixture is stirred for 2 hours at 0°-5° C. and an excess of nitrite is constantly maintained in the meantime. The excess nitrous acid is then destroyed with sulphamic acid. A solution of 45.6 g of N-[3-(dipropylamino)-phenyl]-oleoylamide in the form of the hydrochloride in 50 ml of glacial acetic acid is then added to the mixture. The coupling is complete in the course of 5 hours. The precipitate is filtered off with suction and thoroughly washed with water. The moist paste is taken up in 300 ml of toluene and the solution is washed with 200 ml of 1N sodium carbonate solution. The organic phase is separated off, and the toluene is removed by distillation. The residue which remains (61.8 g) is dissolved in 60 g of toluene. This gives a 50% strength solution of a dyestuff of the formula

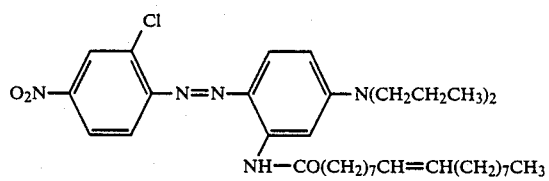

10 g of the dyestuff solution, 69.5 g of toluene and 25.5 g of alsynol KZ 71, a hydrocarbon resin made by Synres, are mixed. This gives a toluene gravure printing ink having a viscosity corresponding to a flow time of 23 seconds in the DIN 3 cup specified in DIN 53,211. This printing ink is used to print gravure printing paper on a Dürner gravure printing handproofing apparatus, very deep bluish-tinged red prints being obtained. When these prints are assessed, it is found that the printing ink already has a very good strike-through behaviour.

A somewhat worse strike-through behaviour, compared with printing inks of the same viscosity prepared solely with the aid of pigments, is only found on very light papers.

Example 2

A printing ink consisting of 10 g of the dyestuff solution according to Example 1, 70 g of toluene and 25 g of Alsynol KZ 71 and also containing, in addition, a dispersion of 0.8 g of Aerosil 380, a finely disperse silica made by Degussa, is prepared analogously to Example 1. The properties of the printing ink correspond to those of the printing ink according to Example 1, but the strike-through behaviour is satisfactory even when paper of a low weight per unit area is printed.

Similar results are obtained if Aerosil 300, Aerosil 200 or HDKT 40, a finely disperse silica made by Wacker Chemie, is employed instead of Aerosil 380.

The silicas mentioned have BET specific surface areas of 300, 200, 400 and 380 $m^2/g$, respectively.

Printing inks having similar properties are obtained analogously to Examples 1 and 2 by means of the dyestuffs prepared from the components listed in the table below:

TABLE 1

| Example No. | Diazo component | Coupling component | Colour shade of the print |
|---|---|---|---|
| 3 | 2-bromo-4-nitroaniline (Br, $O_2N$, $NH_2$) | phenyl-$N(CH_2CH_2CH_3)_2$ with $NH-CO(CH_2)_7CH=CH(CH_2)_7CH_3$ | bluish-tinged red |
| 4 | 4-nitroaniline ($O_2N$, $NH_2$) | phenyl-$N(CH_2CH_2CH_3)_2$ with $NH-CO(CH_2)_7CH=CH(CH_2)_7CH_3$ | red |
| 5 | 4-chloro-2-nitroaniline ($NO_2$, $Cl$, $NH_2$) | phenyl-$N(CH_2CH_2CH_3)_2$ with $NH-CO(CH_2)_7CH=CH(CH_2)_7CH_3$ | red |
| 6 | 2-chloro-4-nitroaniline ($Cl$, $O_2N$, $NH_2$) | phenyl-$N(C_2H_5)_2$ with $NH-CO(CH_2)_7CH=CH(CH_2)_7CH_3$ | bluish-tinged red |
| 7 | 2-chloro-4-nitroaniline ($Cl$, $O_2N$, $NH_2$) | phenyl-$N(CH_2CH_2CH_2CH_3)_2$ with $NH-CO(CH_2)_{16}CH_3$ | bluish-tinged red |
| 8 | 2-chloro-4-nitroaniline ($Cl$, $O_2N$, $NH_2$) | phenyl-$N(CH_2\overset{OH}{C}HCH_2OCH_2CH=CH_2)_2$ with $NH-CO(CH_2)_{10}CH_3$ | bluish-tinged red |

TABLE 1-continued

| Example No. | Diazo component | Coupling component | Colour shade of the print |
|---|---|---|---|
| 9 | 2-chloro-4-nitroaniline (O$_2$N—C$_6$H$_3$(Cl)—NH$_2$) | 3-[N(CH$_2$CH(OH)CH$_2$OCH$_2$CH(C$_2$H$_5$)(CH$_2$)$_3$CH$_3$)$_2$]-aniline with NH—CO(CH$_2$)$_7$CH=CH(CH$_2$)$_7$CH$_3$ | red |
| 10 | 4-nitroaniline (O$_2$N—C$_6$H$_4$—NH$_2$) | 3-[N(CH$_2$CH(OH)CH$_2$OCH$_2$CH(C$_2$H$_5$)(CH$_2$)$_3$CH$_3$)$_2$]-aniline with NH—CO(CH$_2$)$_7$CH=CH(CH$_2$)$_7$CH$_2$ | red |
| 11 | 2-chloro-4-nitroaniline | 3-[N(CH$_2$CH(OH)CH$_2$O(CH$_2$)$_{11}$CH$_3$)$_2$]-aniline with NH—COCH$_3$ | bluish-tinged red |
| 12 | 2-chloro-4-nitroaniline | 3-[N(CH$_2$CH(OH)CH$_2$O(CH$_2$)$_{11}$CH$_3$)$_2$]-aniline with NHCOOC$_2$H$_5$ | bluish-tinged red |
| 13 | 2,6-dicyano-4-nitroaniline | 3-N(C$_2$H$_5$)$_2$-aniline with NH—CO(CH$_2$)$_{16}$CH$_3$ | blue |
| 14 | 2-cyano-4,6-dinitroaniline | 3-N(C$_2$H$_5$)$_2$-aniline with NH—CO(CH$_2$)$_{16}$CH$_3$ | blue |
| 15 | 2,6-dicyano-4-nitroaniline | 3-N(C$_2$H$_5$)$_2$-aniline with NH—COCH(C$_4$H$_9$)—C$_2$H$_5$ | blue |
| 16 | 2-cyano-4,6-dinitroaniline | 3-N(C$_2$H$_5$)$_2$-aniline with NH—COCHC$_4$H$_9$—C$_2$H$_5$ | blue |

Example 17

37.9 g of a dyestuff obtained by coupling diazotized 2-chloro-4-nitroaniline with N,N-bis-(2-hydroxyethyl)-3-methylaniline, 200 ml of toluene and 58.6 g of Fibran 68, a dodecenylsuccinic anhydride (mixture) made by National Starch, are heated under reflux for 12 hours, and part of the toluene is then removed by distillation. This gives 135 g of a dark coloured solution of a mixture of dyestuffs of the general formula

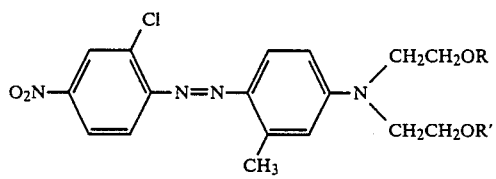

wherein the radicals R and R' represent dodecenylsuccinic acid half-ester groupings.

Printing inks prepared analogously to Examples 1 and 2 produce red prints having properties very similar to those described in these examples.

The dyestuffs listed in the following table were reacted in accordance with the process described in Example 17 with the anhydrides also indicated in the table. The printing inks prepared from the novel esters thus obtained were comparable in their properties with the printing inks prepared in accordance with Examples 1 and 2.

TABLE 2

| Example No. | Dyestuff | Anhydride | Colour shade of the print |
| --- | --- | --- | --- |
| 18 | $O_2N-\text{C}_6H_3(Cl)-N=N-C_6H_3(NHCOCH_3)-N(CH_2CHCH_3)_2\text{—OH}$ | Fibran | bluish-tinged red |
| 19 | $O_2N-\text{C}_6H_3(Cl)-N=N-C_6H_3(NHCOCH_3)-N(CH_2CHCH_3)_2\text{—OH}$ | 4-methylhexahydrophthalic anhydride (= MHPA) | bluish-tinged red |
| 20 | $O_2N-\text{C}_6H_3(NO_2)-N=N-C_6H_3(CH_3)-N(CH_2CH_2OH)_2$ | MHPA | bluish-tinged red |
| 21 | $O_2N-\text{C}_6H_3(NO_2)-N=N-C_6H_3(CH_3)-N(CH_2CH_2OH)_2$ | Fibran | bluish-tinged red |
| 22 | $O_2N-\text{C}_6H_3(NO_2)-N=N-C_6H_3(CH_3)-N(CH_2CHCH_2OCH_2CHC_4H_9)_2$ with OH and $C_2H_5$ | phthalic anhydride | bluish-tinged red |
| 23 | $O_2N-\text{C}_6H_3(NO_2)-N=N-C_6H_3(CH_3)-N(CH_2CHCH_2OCH_2CHC_4H_9)_2$ with OH and $C_2H_5$ | MHPA | bluish-tinged red |
| 24 | $O_2N-\text{C}_6H_3(NO_2)-N=N-C_6H_3(CH_3)-N(CH_2CHCH_2OCH_2CHC_4H_9)_2$ with OH and $C_2H_5$ | hexahydrophthalic anhydride | bluish-tinged red |

TABLE 2-continued

| Example No. | Dyestuff | Anhydride | Colour shade of the print |
|---|---|---|---|
| 25 | 2-Br-4,6-dinitrophenyl azo → 3-methyl-4-[N,N-bis(2-hydroxyethyl)amino]phenyl (NO₂, O₂N, Br, CH₃, N(CH₂CH₂OH)₂) | Fibran | bluish-tinged red |
| 26 | 2-Br-4,6-dinitrophenyl azo → 3-methyl-4-[N,N-bis(2-hydroxyethyl)amino]phenyl | MHPA | bluish-tinged red |
| 27 | 2-Br-4,6-dinitrophenyl azo → 3-methyl-4-[N-ethyl-N-(2-hydroxyethyl)amino]phenyl | Fibran | violet |
| 28 | 2-(methylsulfonyl)-4-nitrophenyl azo → 3-methyl-4-[N,N-bis(2-hydroxyethyl)amino]phenyl | Fibran | red |
| 29 | 2-cyano-4-nitrophenyl azo → 4-[N-butyl-N-(2-hydroxyethyl)amino]phenyl | Fibran | red |

It was possible to prepare printing inks of equally good suitability by means of the dyestuffs of table 3 below.

TABLE 3

| | | colour shade of the print |
|---|---|---|
| Example 30 | 2,6-dicyano-4-methylphenyl azo → 4-(N,N-diethylamino)-2-[NHSO₂(CH₂)₁₁CH₃]phenyl | bluish-tinged red |
| Example 31 | 2,6-dicyano-4-methylphenyl azo → 4-(N,N-di-n-propylamino)-2-[NHSO₂(CH₂)₁₁CH₃]phenyl | bluish-tinged red |
| Example 32 | 2,6-dicyano-4-cyclohexylphenyl azo → 4-(N,N-di-n-propylamino)-2-[NHSO₂(CH₂)₁₁CH₃]phenyl | bluish-tinged red |

TABLE 3-continued

| | | colour shade of the print |
|---|---|---|
| Example 33 | (structure) | bluish-tinged red |
| Example 34 | (structure) | bluish-tinged red |
| Example 35 | (structure) | red |
| Example 36 | (structure) | bluish-tinged red |
| Example 37 | (structure) | bluish-tinged red |
| Example 38 | (structure) | red |
| Example 39 | (structure) | blue |
| Example 40 | (structure) | ruby |

TABLE 3-continued
| | | colour shade of the print |
|---|---|---|
| Example 41 | 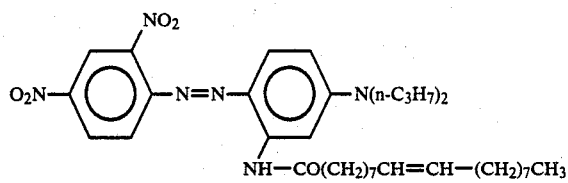 | violet |
| Example 42 | 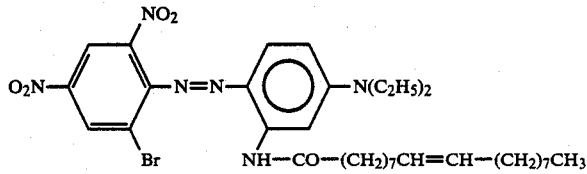 | violet |
| Example 43 | 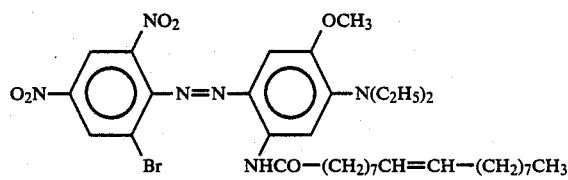 | greenish-tinged blue |
| Example 44 | 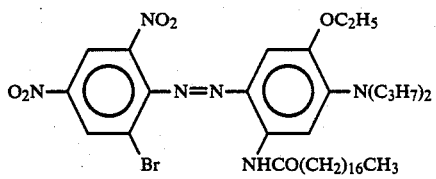 | greenish-tinged blue |
| Example 45 | 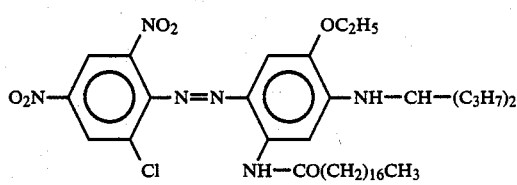 | greenish-tinged blue |
| Example 46 | 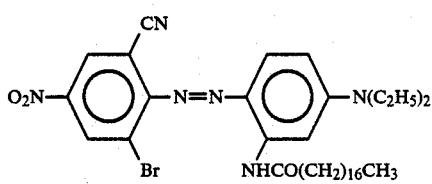 | reddish-tinged blue |
| Example 47 | 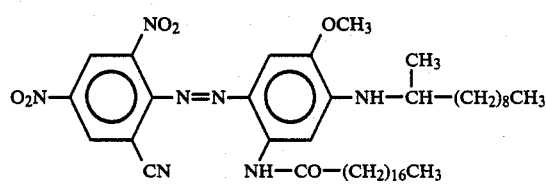 | blue |
| Example 48 | 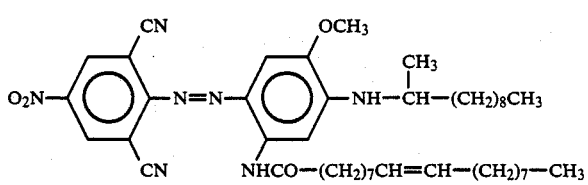 | blue |

TABLE 3-continued

| | | colour shade of the print |
|---|---|---|
| Example 49 | 2,4-dinitro-6-cyanophenyl-azo coupled to aniline with 1,3-dimethylbutyl, NH—COCH$_2$—CH(CO$_2$H)—Dodecenyl, and N(CH$_2$CH$_2$—O—CO—CH$_2$—CH(Dodecenyl)—CO$_2$H) substituents | blue |
| Example 50 | 2,6-dicyano-4-nitrophenyl-azo coupled to aniline with 1,3-dimethylbutyl, CH$_3$, and N(CH$_2$CH$_2$—O—CO—CH$_2$—CH(Dodecenyl)—CO$_2$H) substituents | blue |
| Example 51 | 2,6-dicyano-4-nitrophenyl-azo coupled to aniline with 1,3-dimethylbutyl, N(CH$_2$CH$_3$), and NH—CO(CH$_2$)$_7$—CH=CH—(CH$_2$)$_7$CH$_3$ substituents | blue |
| Example 52 | 2,6-dicyano-4-nitrophenyl-azo coupled to aniline with N-pyrrolidinyl and NHCO(CH$_2$)$_{16}$CH$_3$ substituents | blue |
| Example 53 | 2,6-dicyano-4-nitrophenyl-azo coupled to aniline with N-piperidinyl and NHCO(CH$_2$)$_7$CH=CH—(CH$_2$)$_7$CH$_3$ substituents | blue |
| Example 54 | 2,6-dicyano-4-methylphenyl-azo coupled to aniline with N((CH$_2$)$_3$CH$_3$)(CH$_2$CH$_2$—O—CO—CH$_2$—CH(Dodecenyl)—CO$_2$H), and CH$_3$ substituents | red |
| Example 55 | 2-cyano-4-nitro-6-trifluoromethylphenyl-azo coupled to aniline with N(C$_2$H$_5$)$_2$ and NHCO(CH$_2$)$_{16}$CH$_3$ substituents | blue |

TABLE 3-continued

| | | colour shade of the print |
|---|---|---|
| Example 56 | structure with $O_2N$, CN, $CF_3$, $CH_3$, $C_2H_5$, $NHCO-(CH_2)_7CH=CH-(CH_2)_7CH_3$ | blue |
| Example 57 | structure with CN, $H_3CO_2S$, $N(n-C_4H_9)_2$, $NHCO-(CH_2)_{16}-CH_3$ | red |
| Example 58 | $n-C_{12}H_{25}O-CH_2CH_2-SO_2-$ aryl with two CN groups $-N=N-$ aryl $-N(n-C_4H_9)_2$ | red |
| Example 59 | $n-C_9H_{19}O-CH_2CH_2-SO_2-$ aryl with two CN groups $-N=N-$ aryl $-N(n-C_8H_{17})_2$ | red |
| Example 60 | phenyl-$N=N-$ aryl(CN, CN)$-N=N-$ aryl$-N(C_4H_9)_2$, $NHCO(CH_2)_7CH=CH-(CH_2)_7CH_3$ | blue |
| Example 61 | $O_2N-$aryl$-N=N-$aryl$-N(CH_2CH_2CN)(CH_2CH_2-O-CO-CH_2-CH(Dodecenyl)-CO_2H)$ | orange |
| Example 62 | $O_2N-$aryl(Cl)$-N=N-$aryl$-N(CH_2CH_2CN)(CH_2CH_2CO-O-C_{12}H_{25}(n))$ | scarlet |
| Example 63 | $O_2N-$aryl(CN)$-N=N-$aryl$-N(C_2H_4CN)(C_2H_4O-CO-CH_2-CH(Dodecenyl)-CO_2H)$ | red |
| Example 64 | $O_2N-$aryl(CN)$-N=N-$aryl(Cl)$-N(n-C_8H_{17})_2$ | red |

TABLE 3-continued

| | | colour shade of the print |
|---|---|---|
| Example 65 | 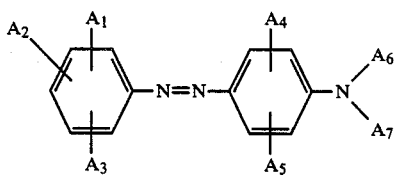 | red |
| Example 66 | 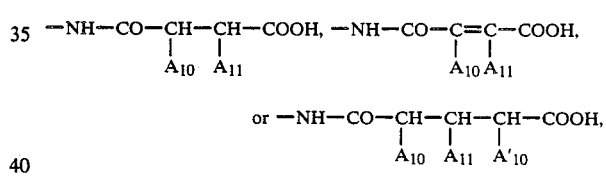 | red |

We claim:
1. A halftone gravure printing ink comprising
   (A) about 2 to about 20% by weight of colorant,
   (B) about 10 to about 40% by weight of resin,
   (C) about 80 to about 50% by weight of solvent
wherein said colorant comprises a dyestuff of the formula

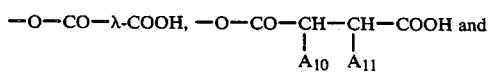

in which $A_1$, $A_2$ and $A_3$ denote hydrogen, halogen, —CN, —$NO_2$, $C_1$-$C_6$-alkyl, cycloalkyl, $C_1$-$C_{18}$-alkoxy, phenoxy, or phenoxy substituted by $C_1$-$C_6$-alkyl, $C_1$-$C_6$-alkoxy, Cl, Br, F, $NO_2$ or cyclohexyl, $C_1$-$C_{18}$-alkylsulphonyl, or $C_1$-$C_{18}$-alkylsulphonyl substituted by $C_1$-$C_6$-alkoxy, phenylsulphonyl or phenylsulphonyl substituted by $C_1$-$C_6$-alkyl, $C_1$-$C_6$-alkoxy, Cl, Br, F, $NO_2$ or cyclohexyl, sulphamoyl, or sulphamoyl substituted by $C_1$-$C_{18}$-alkyl or $C_1$-$C_{18}$-alkyl substituted by —OH, CN or —O—CO—λ-COOH, —O—CO—CH(A10)—CH(A11)—COOH and

—O—CO—C(A10)=C(A11)—COOH wherein $A_{10}$ and $A_{11}$ are defined below, carbamoyl or carbamoyl substituted by $C_1$-$C_{18}$-alkyl or $C_1$-$C_{18}$-alkyl substituted by —OH, CN or —O—CO—λ-COOH, —O—CO—CH(A10)—CH(A11)—COOH and

—O—CO—C(A10)=C(A11)—COOH wherein $A_{10}$ $A_{11}$ are defined below, phenylazo or phenylazo substituted by $C_1$-$C_6$-alkyl, $C_1$-$C_6$-alkoxy, Cl, Br, F, $NO_2$ or cyclohexyl, $C_1$-$C_{18}$-alkoxycarbonyl, —$CF_3$, —SCN, $C_1$-$C_{12}$-alkylmercapto, $C_1$-$C_6$-alkylcarbonyl, phenylcarbonyl or phenyl carbonyl substituted by $C_1$-$C_6$-alkyl, $C_1$-$C_6$-alkoxy, Cl, Br, F, $NO_2$ or cyclohexyl, or —OH, $A_4$ and $A_5$ denote hydrogen, halogen, $C_1$-$C_6$-alkyl, or $C_1$-$C_6$-alkyl substituted by —COOH or $C_1$-$C_6$-alkoxycarbonyl, $C_1$-$C_6$-alkoxy, or $C_1$-$C_6$-alkoxy substituted by $C_1$-$C_4$-alkoxy, —NH—CO—$CH_2$C-$H_2OA_8$, —NH—CO—$A_8$, —NH—$SO_2$—$A_8$, NH—CO—O—$A_9$, —NH—CO—A—COOH, —NH—CO—$CH_2OA_8$,

—NH—CO—CH(A10)—CH(A11)—COOH, —NH—CO—C(A10)=C(A11)—COOH, or —NH—CO—CH(A10)—CH(A11)—CH(A'10)—COOH $A_8$ denotes $C_1$-$C_{22}$-alkyl, $C_2$-$C_{22}$-alkenyl, $C_3$-$C_7$-cycloalkyl, phenyl, naphthyl or phenyl-$C_1$-$C_4$-alkyl, or phenyl naphthyl or phenyl-$C_1$-$C_4$ alkyl wherein the aryl is substituted by $C_1$-$C_6$-alkyl, $C_1$-$C_6$-alkoxy, CL, Br, F, —$NO_2$ and cyclohexyl, $A_9$ denotes $C_1$-$C_{22}$-alkyl, $C_2$-$C_{22}$-alkenyl, $C_3$-$C_7$-cycloalkyl or phenyl-$C_1$-$C_4$-alkyl, $A_{10}$, $A'_{10}$ and $A_{11}$ denote hydrogen, $C_1$-$C_{22}$-alkyl or $C_2$-$C_{22}$-alkenyl, A denotes

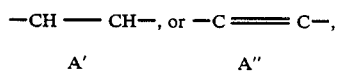

A' and A" denote the remaining members of a carbocyclic 5-membered or 6-membered ring which is unsubstituted or substituted by $C_1$-$C_4$-alkyl, halogen, or —COOH, $A_6$ denotes aryl, or $A_7$ and $A_7$ denotes hydrogen or unsubstituted $C_1$-$C_{22}$-alkyl or $C_2$-$C_{22}$-alkenyl; $C_1$-$C_{22}$-alkenyl or $C_2$-$C_{22}$-alkenyl substituted by —OH, —CN, —O—CO—A—COOH,

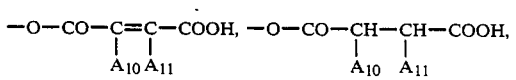

-continued

—O—CO—A$_8$, —O—COO—A$_9$, —COOA$_9$ or —OA$_{12}$;

unsubstituted C$_1$–C$_{22}$-alkyl or C$_2$–C$_{22}$-alkenyl which are interrupted by non-adjacent O-atoms; or C$_1$–C$_{22}$-alkyl or C$_2$–C$_{22}$-alkenyl which are interrupted by non-adjacent O-atoms and are substituted by —OH, —CN, —O—CO—A—COOH, —O—CO—C=C—COOH, —O—CO—CH—CH—COOH,
    |    |                    |    |
    A$_{10}$ A$_{11}$                  A$_{10}$ A$_{11}$ —O—CO—A$_8$, —O—COO—A$_9$, —COOA$_9$ or —OA$_{12}$, A$_{12}$ represents C$_3$–C$_7$-cycloalkyl, phenyl, naphthyl and phenyl-C$_1$–C$_4$-alkyl, or A$_7$ represent C$_3$–C$_7$-cycloalkyl; or A$_4$ and A$_6$ are connected to form a ring, or A$_6$ and A$_7$ are cyclized by —(CH$_2$)n-groups where n=4 or 5 or —(CH$_2$)$_2$—O—(CH$_2$)$_2$—group.

2. A halftone gravure printing ink according to claim 1, in which the dyestuff is of the formula

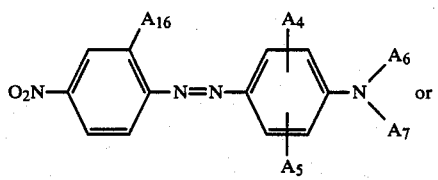
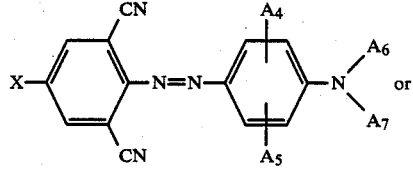
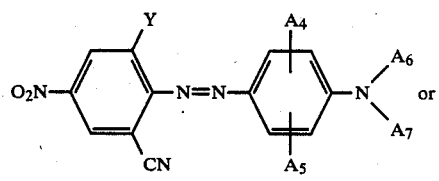
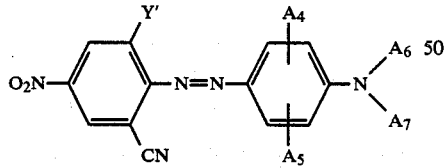

in which
A$_{16}$ denotes Cl, Br or CN,
X denotes H, CH$_3$, C$_2$H$_5$, C$_6$H$_{12}$, —C(CH$_3$)$_3$, C$_1$–C$_4$-alkoxy, Cl or Br,
T denotes —NO$_2$, —CN, —CF$_3$, —C$_1$–C$_{12}$—alkylsulphonyl and Y' denotes —NO$_2$ or —CN.

3. A halftone gravue printing ink according to claim 1, in which the dyestuff is of the formula

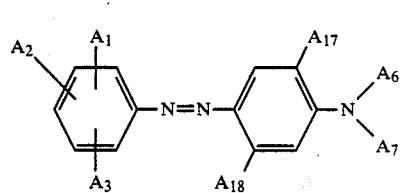

in which
A$_{17}$ denotes hydrogen, chlorine, C$_1$–C$_4$-alkyl, and C$_1$–C$_4$-alkoxy, and
A$_{18}$ denotes

—NH—CO—CH$_2$CH$_2$—OA$_8$, —NH—CO—A$_8$,
—NH—CO—A$_9$, —NH—CO—A—COOH,

—NH—COCH$_2$—OA$_8$  —NH—CO—CH—CH—COOH, or
                              |    |
                              A$_{10}$ A$_{11}$

—NH—CO—C=C—COOH.
         |    |
         A$_{10}$ A$_{11}$

4. A halftone gravure printing ink according to claim 1, in which the dyestuff is of the formulae

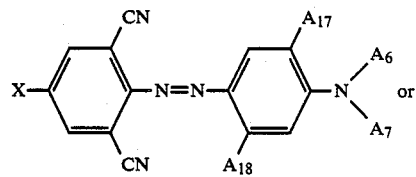
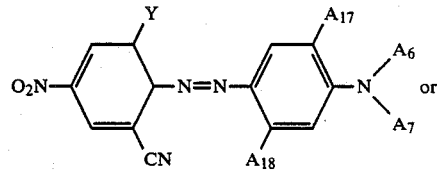
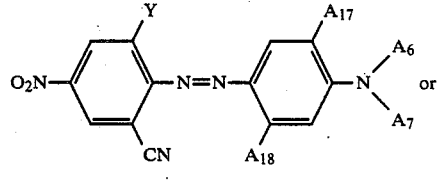
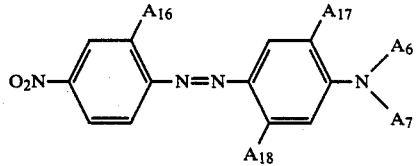

5. A halftone gravure printing ink according to claim 1, in which said solvent comprises toluene.

6. A halftone gravure printing ink according to claim 1, wherein said ink further comprises at least one pigment.

* * * * *

UNITED STATES PATENT AND TRADEMARK OFFICE
CERTIFICATE OF CORRECTION

PATENT NO. : 4,776,886
DATED : October 11, 1988
INVENTOR(S) : Manfred Lorenz, et al It is certified that error appears in the above-identified patent and that said Letters Patent is hereby corrected as shown below:

Abstract, line 11 from bottom; Col. 2, line 26, and Col. 28, line 54 — Delete formula and substitute $$-\underset{A'}{\underbrace{CH-CH}}-, \text{ or } -\underset{A''}{\underbrace{C=C}}-,$$

Col. 1, line 12 — Correct spelling of --Encyclopaedia--

Col. 6, line 46 — Bottom of formula on right side delete "$/\atop A_5$" and substitute --$/\atop A_5'$--

Col. 8, line 50 — Delete "formulaI" and substitute --formula I--

Col. 17, line after Table 2 — Delete "table 3" and substitute --Table 3--

Col. 27, line 40 — Delete "C18" and substitute --$C_{18}$--

Col. 28, line 63 — Delete "$C_1$-$C_{22}$-alkenyl" and substitute --$C_1$-$C_{22}$-alkyl--

Signed and Sealed this

Twenty-second Day of August, 1989

Attest:

DONALD J. QUIGG

Attesting Officer

Commissioner of Patents and Trademarks